United States Patent [19]
Vick et al.

[11] Patent Number: 6,074,623
[45] Date of Patent: Jun. 13, 2000

[54] PROCESS FOR THERMAL DESTRUCTION OF SPENT POTLINERS

[76] Inventors: Steven C. Vick, 9707 Welwyn Ln., Charlotte, N.C. 28210; Hans O. Von Steiger, Thompson Ave., Oak Bluffs, Mass. 02557

[21] Appl. No.: 09/170,048

[22] Filed: Oct. 13, 1998

Related U.S. Application Data

[60] Provisional application No. 60/061,911, Oct. 14, 1997.

[51] Int. Cl.[7] ................................. C01F 7/04; A62D 3/00
[52] U.S. Cl. .................. 423/418.2; 423/130; 423/483; 423/659; 423/648.1; 588/248
[58] Field of Search ................... 423/130, 415.1, 423/437, 648.1, 655, 43, 111, 120, 659, 418.2, 483; 204/247; 588/248, 201, 252; 252/373

[56] References Cited

U.S. PATENT DOCUMENTS

| | | | |
|---|---|---|---|
| 4,158,701 | 6/1979 | Andersen et al. | 423/119 |
| 5,164,174 | 11/1992 | Banker et al. | 423/659 |
| 5,222,448 | 6/1993 | Morgenthaler et al. | 110/346 |
| 5,280,757 | 1/1994 | Carter et al. | 110/346 |
| 5,364,447 | 11/1994 | Philipp et al. | 75/500 |
| 5,496,392 | 3/1996 | Sims et al. | 75/414 |
| 5,616,296 | 4/1997 | Hittner et al. | 266/145 |
| 5,711,018 | 1/1998 | Hittner et al. | 588/201 |
| 5,961,811 | 10/1999 | Keller | 205/386 |

*Primary Examiner*—Steven P. Griffin
*Assistant Examiner*—Cynthia N. Donely
*Attorney, Agent, or Firm*—Smith, Gambrell & Russell, LLP

[57] ABSTRACT

Spent potliners from the aluminum processing industry are destroyed by gasification technology to produce an inert vitreous frit and useful gases including hydrogen fluoride, hydrogen and carbon monoxide. In one embodiment, the potliner material is processed in a slagging gasification unit in which the potliner material a bed of coke or other particulate material moves down through a preheating zone, a reduction zone and an oxidation zone where oxygen is injected into the then-incandescent bed. In a second embodiment, particles of spent potliner material are entrained in two rotating gaseous streams which are tangentially introduced into upper and lower regions of a processing vessel. In a third embodiment, particles of spent potliner material are entrained in and reacted with a stream of gases which flows down from a burner through a processing vessel.

27 Claims, 1 Drawing Sheet

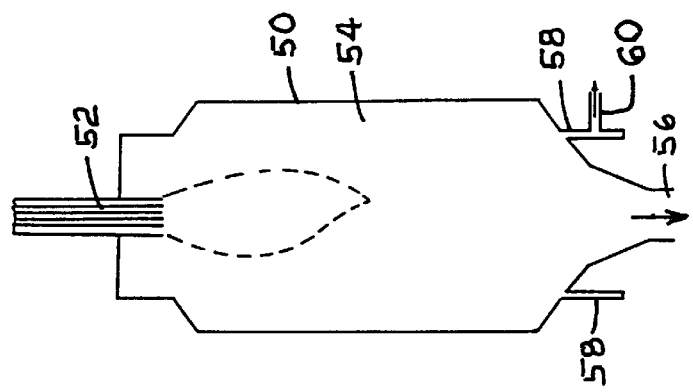
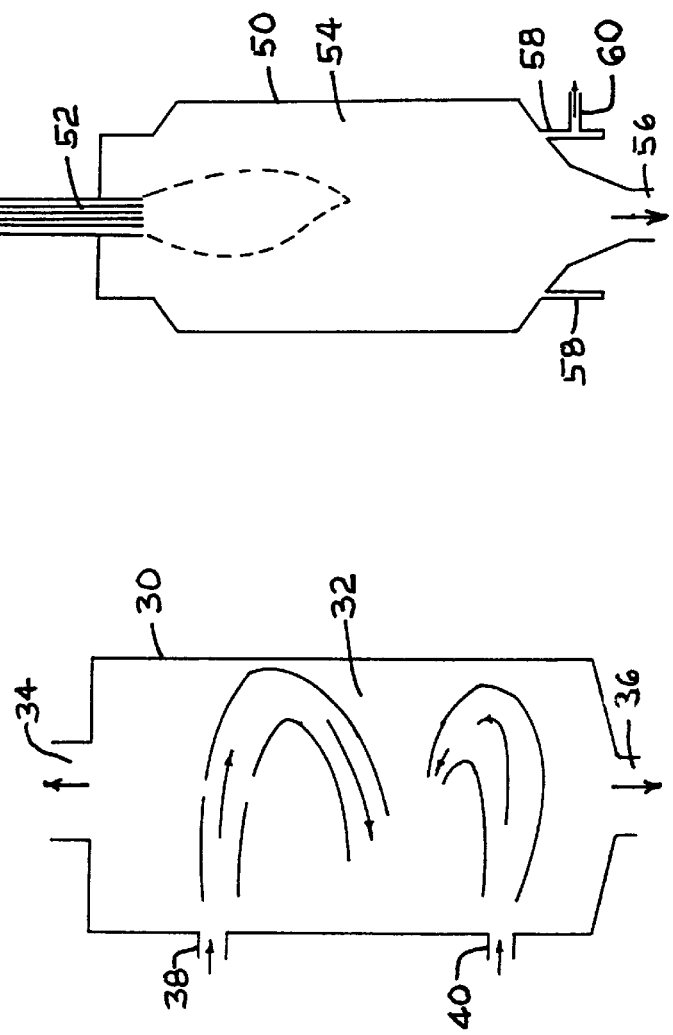
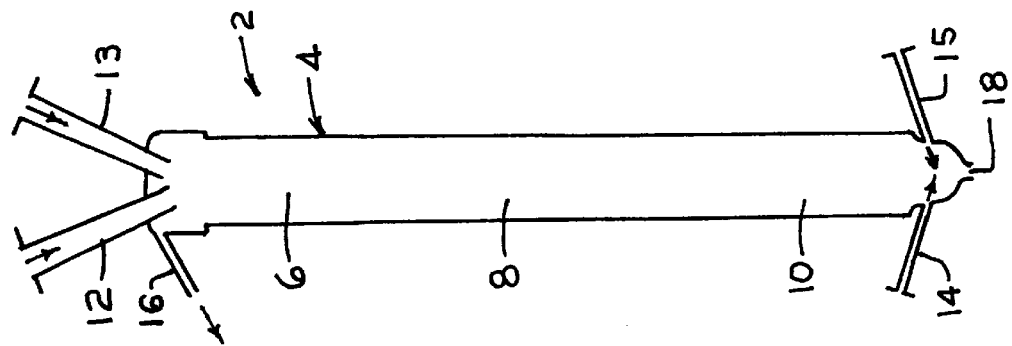

PROCESS FOR THERMAL DESTRUCTION OF SPENT POTLINERS

REFERENCE TO RELATED APPLICATION

This specification claims priority benefits under 35 United States Code § 119(e) of U.S. Provisional Application No. 60/061,911 filed Oct. 14, 1997, the entire contents of which are incorporated herein by reference.

BACKGROUND

This invention relates to the destruction of spent potliners derived from the metal processing industry.

During the production of aluminum, reinforced steel pots (cells) lined with brick hold the cryolite bath which is required for the electrolytic reduction of alumina. After usage, the linings of these pots degrade to the point that they no longer function properly. The spent potliners typically have been landfilled. The aluminum industry generates spent potliners at a rate of roughly 2% to 4% by weight of the aluminum produced. The production of spent potliner in the U.S. is approximately 120,000 tons per year.

Spent potliner has a following approximate analysis with some variation:

| Component | wt % |
| --- | --- |
| carbon | 60.0 |
| sodium oxide | 14.0 |
| aluminum oxide | 11.0 |
| iron oxide | 0.4 |
| silicon dioxide | 0.5 |
| calcium oxide | 1.25 |
| fluorine | 15.0 |
| cyanide | 0.2 |
| ammonia | 0.005 |

The presence of leachable cyanide, fluoride and trace metals caused the U.S. Environmental Protection Agency to classify spent potliner as a listed hazardous waste (K088). The EPA then promulgated rules which impose treatment standards and restrict the land disposal of K088 spent potliner wastes (see 40 CFR part 268, Apr. 8, 1996). At that time, EPA believed the rotary kiln at the Reynolds facility in Gum Springs, Ark. would provide sufficient treatment capacity for the entire U.S. annual burden of spent potliner. Subsequent events discussed below have demonstrated that the Reynolds rotary kiln did not adequately treat the spent potliner as the residue from the kilns exhibited unacceptable leaching profiles, especially for cyanide and fluoride. EPA delayed the imposition of the treatment standards for spent potliner.

Technology has been proposed for the destruction of spent potliners from the aluminum manufacturing industry. The primary method proposed for the destruction of the spent potliners is exemplified by the rotary kilns at the Reynolds facility in Gum Springs, Ark. and U.S. Pat. No. 5,164,171 which discloses the detoxification of spent potliner material ("SPL") by the crushing and sizing of spent potliner materials along with the addition of roughly equal portions of limestone and sand as both a fluxing agent and a reactant, followed by the feeding of the mixture to a rotary kiln at a temperature of between 1200–1700 degrees Fahrenheit for the thermal destruction of the cyanides, polyaromatic hydrocarbons, and other organic materials found in the spent potliners. The combined feeds are heated in the kiln, the organic materials are destroyed via oxidation or combustion with oxygen, and the inorganic materials are removed from the kiln as a residue. This residue is claimed to be non-leachable by EPA standards under the TCLP requirement. In fact, however, the total destruction of the organic materials is not achieved. It has been found that leachate from the residue materials contain significantly higher quantities of the cyanide than had been predicted. In addition, the leachate contains large quantities of fluoride, levels well above national standards. As a result this technology, while currently approved by EPA, is not acceptable to the industry as a whole. The use of oxygen and steam to gasify the carbon content of the SPL, producing a valuable synthesis gas, is not disclosed. Alternative technologies have been sought.

An alternative technology has been proposed by Vortec Corp. in U.S. Pat. No. 5,558,690. Vortec has created an above ground oxidation and vitrification process for the remediation of spent potliner material. This system vitrifies the waste materials and presumably totally encapsulates the inorganic material while at the same time destroys any organic material found in the spent potliners material. At the heart of the process is the Vortec cyclone melting system, which consists of a counter-rotating vortex combustor and a cyclone melter. For proper vitrification to take place, the spent potliner material may be mixed with glass making ingredients such as silicon dioxide and limestone. This mixture, along with propane fuel and essentially pure oxygen, is introduced to the counter-rotating vortex combustor. Temperatures of up to three thousand degrees Fahrenheit destroy the organic compounds and melt the inorganic materials. This slag mixture which is formed then is thrown to the cyclone melter wall. The molten glass is quenched in water and removed for storage. The average temperature of the materials leaving the combustion chamber is typically between 2200 and 2700 degrees Fahrenheit prior to being quenched in the water. Typically in the Vortec process, a relatively large excess of oxygen is utilized resulting in downstream handling problems and increased costs. An additional fuel such as propane or natural gas is utilized in this technology, thus increasing the cost significantly. The products of combustion, carbon dioxide and water, are released as stack emissions to the environment. Although this technology claims to be strictly recycling, the only material actually recycled is the inorganic component of the spent potliner material. This reclaimed material is a frit which is claimed to be recyclable and utilized with in the aluminum industry. Some of the fluorine is recovered overhead as hydrogen fluoride which then is recycled back to the aluminum industry as aqueous hydrofluoric acid. The carbon contained within the spent potliners is not recoverable and is released to the atmosphere as carbon dioxide rather than being converted to a valuable synthesis gas via gasification.

Another technology, from Ausmelt Ltd. of Australia, has been proposed to be able to handle spent potliner material. In this process, spent potliner and flux are melted at 2000–2200 degrees Fahrenheit while oxygen is blown into the melt through a submerged lance to fuel the combustion process. Oxygen is used rather than air to increase concentration of hydrogen fluoride in the off gas. Presumably the use of pure oxygen to combust all of the carbon contained within the material is an improvement in that it is easier to treat the hydrofluoric acid that comes out over head. In this process, cyanide is destroyed and all of the carbon present in the spent potliners material is oxidized/combusted to form carbon dioxide. All inorganic components excluding the overhead hydrogen fluoride are recovered in an inert slag. Presumably this slag may be used as road building aggregates and for other purposes. The overhead hydrogen fluoride can be used to produce aluminum fluoride which is an additive in the aluminum smelting industry. The carbon contained within the spent potliners is not recoverable and is released to the atmosphere as carbon dioxide.

U.S. Pat. No. 4,993,323 teaches the fluidized bed combustion of SPL at 800–1000 degrees Centigrade. A mixture of SPL, limestone and lignite is granulated and fully combusted to form carbon dioxide and a free-flowing ash. Production of a synthesis gas, hydrogen fluoride or an environmentally benign vitreous frit via gasification processes are not disclosed in this patent.

U.S. Pat. No. 4,735,784, assigned to Morrison-Knudsen Company, Inc., discloses a method for treating SPL which involves adding silica to the SPL to form a mixture, heating this mixture to 1,000–1,700 degrees Centigrade to form a slag in the presence of sufficient water or steam to volatilize the fluoride containing contaminants in the form of hydrogen fluoride. The remaining slag is cooled to form an insoluble silicate glass with any remaining fluoride in an immobile state. Not disclosed is the production of a valuable Synthesis Gas via gasification.

U.S. Pat. No. 5,222,448, assigned to Columbia Ventures Corporation, discloses a method for treating SPL in which the SPL is exposed to the high heat of a plasma torch as an energy source. Carbon from the SPL is evolved as a carbon oxide or hydrocarbon, mostly as carbon dioxide. Fluoride compounds are either melted or evolved as hydrogen fluoride and all inorganic material is melted to form a slag. The gasification of the SPL with oxygen and steam to form valuable Synthesis Gas and hydrogen fluoride is not disclosed. It was estimated that the power consumption to treat 200 tons/day of SPL by this plasma torch technology is between 3.3–6.6 megawatt hours, continuously. On the other hand, the present invention would result in a net energy production of approximately 14.7 megawatt hours continuously, a significant energy and cost savings not realized in U.S. Pat. No. 5,222,448.

The present inventors are associated with the licensee of U.S. Pat. Nos. 4,869,741, 4,950,309, 5,074,890 and 5,245,113, which are discussed below.

U.S. Pat. No. 4,869,741 entitled "Process for the thermal decomposition of toxic refractory inorganic substances" relates to the destruction of toxic organic refractory substances including halogenated organic biocides, organophosphates, and waste streams from their production. The toxic substances are fed into a refractory lined reaction chamber (a long vertical tube lined with refractory material) along with oxygen and steam in order to convert the toxics into gaseous reaction products comprising carbon monoxide and hydrogen. The reaction takes place at a temperature of 2500 to 3200 degrees Fahrenheit and the reactor is packed with an incandescent solid refractory inorganic oxide such as zirconia or aluminum.

U.S. Pat. No. 4,950,309 entitled "Process for the conversion of toxic organic substances to useful products" discloses a method for destroying toxic refractory substances including sewage sludge, hospital waste, halogenated hydrocarbons, and organophosphates by contacting the toxics with steam or water, oxygen, and incandescent solid carbon such as coke. The toxics, steam and oxygen are initially contacted in a first reaction zone at 2500 to 3200 degrees Fahrenheit to form a reducing gas stream which is then reacted with the carbon in the second reaction zone to recover a product gas comprising carbon monoxide and hydrogen free from organic halides, U.S. Pat. No. 5,074,890 entitled "Process for the thermal decomposition of toxic refractory organic substances" is similar to the above, and discloses the destruction of toxic refractory substances including dioxins, polyhalogenated biphenyls, halogenated organic biocides and organophosphates. The toxics are initially reacted with steam and oxygen for five to five hundred milliseconds in a refractory lined reaction chamber. The resulting gaseous reaction products then are contacted with incandescent carbon solids contained in a bed at 2500 to 3200 degrees Fahrenheit. The carbonaceous solid is fed downward through a moving bed, and is thereby gasified, in addition to reacting with the gaseous reaction products.

U.S. Pat. No. 5,245,113 entitled "Decontamination of PCB contaminated solids" discloses a method for the detoxification of electrical hardware contaminated with polychlorinated biphenyls (PCB's). The hardware is first contacted with the carrier reducing gas comprising hydrogen and carbon monoxide at a temperature of 750–950 degrees Fahrenheit in a furnace to thereby vaporize the PCBs. The reducing gas is then fed into a reaction zone where the PCBs are destroyed by the partial oxidation of a carbonaceous fuel with oxygen and steam at a temperature of 2500 to 3500 degrees Fahrenheit. A portion of the reducing gas can be sent back to the furnace to vaporize more PCBs. This and all other patents mentioned in this specification are incorporated herein by reference.

The basic technology described in the above four patents, called Slagging Gasification Injection (SGI) technology, is a modification of proven gasification technologies which evolved over a hundred years and was first employed in the early 1960s as an independent technology by the U.S. Department of Energy and developed separately over the period 1974 to 1991 by British Gas. The oxygen blown, fixed bed, slagging gasifier that is the core of SGI technology is similar to, but simpler in operation than, the blast furnace of the steel industry, which has a history of reliable operation of over a century. The high temperatures achievable afford total destruction of the most refractory organic (such as polychlorinated biphenyls and dioxins) at very high throughput rates. The gasifier, with its bed of incandescent carbon, readily accepts wide variations in composition of the organic and inorganic waste streams, and it operates successfully at high or low throughput rates, thus increasing its versatility.

An SGI unit is shown schematically in FIG. 1 and described briefly below. Very simply, the gasifier is a long, vertical tube filled with a constantly descending bed of carbonaceous material. In the patents described above this is generally coke, although coal may be utilized. Additional patents describe the feed of municipal solid waste or sewage sludge solids being fed to the top of the gasification unit. Although individual pieces of coke or coal constantly descend, and are consumed, during the SGI operation, the column of material is kept at a fixed height via a system of feed lock hoppers, locked valves and level gauges. The unit is therefore called a "fixed bed" slagging gasifier. At the bottom of the unit is a hearth with or without a grate to support the carbon substrate bed. At the hearth are injection ports (tuyeres, burners) for the introduction of oxygen, steam and the liquid or pumpable waste materials to be destroyed. The SGI unit is run at a pressure of approximately 350 psig, although higher pressures to attain correspondingly higher throughputs are possible. The following zones exist within the SGI unit once the unit is in operation.

The oxidation zone is present at the point the tuyeres introduce the oxygen, steam and waste streams. Predominantly traditional oxidation or combustion takes place in this zone. Carbon and hydrogen bearing materials (the industrial waste materials and/or coke) are converted into carbon dioxide and water via oxidation or combustion with the oxygen. This zone is similar to an incinerator except for the fact that the unit utilizes pure oxygen rather than the air used by the commercial incinerators. This results in a significantly higher temperature than is possible in a conventional air blown incinerator. The maximum temperatures in the zone are expected to be greater than 2800 degrees Fahrenheit, with actual, in operation temperatures of 3000 to 3600 degrees Fahrenheit. By contrast, conventional incinerators are believed to operate in a maximum temperature less than 2600 degrees Fahrenheit and normal operating conditions are thought to be in the 2100 to 2400 degrees Fahrenheit range. This is a significant difference in operating temperature and will result in exceptional destruction efficiency as well as other benefits for SGI technology. An added benefit is that the use of oxygen rather than air results in a major volume reduction for the SGI product gas as compared to the stack emissions of the traditional incinerator design. Substantial savings in downstream gas purification are realized as a result of the low SGI product gas volume.

Immediately above the short oxidation zone and the point of introduction of the oxygen, is the reduction zone. At this point, the oxygen will have been completely consumed. The residual co-injected steam and the water of combustion will be contacted with the incandescent carbon bed to generate hydrogen, carbon monoxide and some methane and carbon dioxide. This atmosphere coupled with the incandescent carbon bed acts as a powerful reducing medium. The temperature of this reduction zone varies from the hearth temperature of about 3600 degrees Fahrenheit to greater than 2400 degrees Fahrenheit at the four foot level. This harsh reducing atmosphere is present in the unit for a substantial length and provides for a long residence time at high temperatures. The total residence time at temperatures in excess of 2400 degrees Fahrenheit is in excess of two seconds, with temperatures in excess of 3000 degrees Fahrenheit being maintained for over one second, thus insuring total destruction of the waste material fed into the SGI unit.

The technology described in the preceding four patents disclose the destruction of toxic wastes that are either liquids or pumpable solids and which are fed into the hearth zone of the SGI unit. Other patents describe the destruction of municipal solid wastes and sewage sludge solids which are briquetted along with coal or coke and fed to the top of the gasification unit as solids. These patents describe only the use of briquetted material such as municipal solid wastes briquetted with coal or coke. They do not describe, nor do they suggest the processing of spent potliner materials in the SGI unit.

SUMMARY OF THE INVENTION

According to the present invention, a gaseous effluent rich in hydrogen and carbon monoxide is produced from spent potliner material from the metal processing industry by a process which includes the following steps:

(a) feeding pieces of spent potliner material which have inorganic and carbonaceous constituents into a gasification unit;

(b) reacting the spent potliner material with an oxidant gas containing at least 50% by volume of oxygen in a partial oxidation reaction to form a mixture of gases including carbon monoxide and carbon dioxide, this partial oxidation reaction providing a high temperature zone which is at a higher temperature than the melting temperature of the inorganic constituents of the spent potliner material;

(c) reacting the mixture of gases from the partial oxidation reaction to react in reduction reactions with spent potliner material in the presence of steam and absence of oxygen to form hot gaseous products which include carbon monoxide, hydrogen and hydrogen fluoride;

(d) controlling the quantities of steam and oxidant gas which are introduced into the gasification unit to balance the exothermic heat of reaction of the oxygen and the carbonaceous constituents of the spent potliner material with the endothermic heat of reaction of the steam and the carbonaceous constituents, while maintaining a temperature in the high temperature zone which is greater than the melting temperature of the inorganic constituents of the spent potliner material;

(e) removing from the gasification unit a gaseous effluent of which at least 75% by volume is hydrogen, carbon monoxide, and hydrogen fluoride; and (f) discharging from the gasification unit residual solids of the processed potliner material.

In a preferred embodiment, the invention is carried out in a Slagging Gasification Injection unit which has a reaction tube with a preheating zone, a reduction zone below the preheating zone, and an oxidation zone below the reduction zone. Oxidation gas is introduced into the oxidation zone, and steam is introduced into the reduction zone.

In other embodiments, the invention is conducted in an entrained flow gasification unit. Particles of spent potliner material are entrained in one or more gaseous streams. Such gaseous stream(s) may be introduced into the gasification zone unit from a burner or burners directed tangentially of the gasification zone. Mutually opposed burners may also be used. Limestone may be introduced to aid in purification of the gaseous effluent; or, if desired, an additive including a constituent selected from the group consisting of limestone, sand, and silicon dioxide may be introduced to change the melt flow characteristics of the residual solids discharged from the gasification unit.

In one type of entrained flow gasification unit, the gaseous streams are introduced by burners which are directed tangentially into a gasification zone in which a two-stage reaction is conducted. Two such gaseous streams may be introduced tangentially at opposite ends of the gasification zone, and one such stream has a rotational path with a larger diameter than the other stream.

In another type of entrained flow gasification unit, a gaseous stream is introduced by only one burner which is directed axially of the gasification zone, and a one-stage reaction is conducted in the gasification zone. The gaseous stream is introduced longitudinally into one end of the gasification unit.

Alternatively, a one-stage reaction is conducted in a single gasification zone, and the gaseous streams with entrained potliner material are fed into the gasification zone by burners which are mutually opposed or are directed tangentially relative to the gasification zone.

The process may also include a two-stage reaction which is conducted in a plurality of gasification zones into which tangentially directed burners direct the gaseous streams into the gasification zones.

In another respect, the invention concerns a process which is carried out in a vertical reaction tube which has a preheating zone, a high temperature reduction zone which is below the preheating zone, and a high temperature oxidation zone which is below the reduction zone. The process conducted in this apparatus includes the following steps:

(a) feeding pieces of spent potliner material into the preheating zone of the vertical reaction tube;

(b) allowing the pieces to flow downward through the preheating zone while they are heated to a temperature of at least about 2000 degrees Fahrenheit at which they are incandescent;

(c) allowing the preheated potliner material to flow downward from the preheating zone into the reduction zone;

(d) directly contacting the potliner material in the reduction zone with hot gases which include hydrogen and carbon monoxide rising from the oxidation zone, thereby causing further destruction of the potliner material and the simultaneous pyrolysis of any carbonaceous constituents contained therein; the potliner material being heated in the reducing zone to a temperature of at least about 2600 degrees Fahrenheit;

(e) allowing the pieces of spent potliner material to flow downward from the high temperature reduction zone to the high temperature oxidation zone;

(f) introducing into the oxidation zone an oxidant gas containing at least 50% by volume of oxygen to affect the partial oxidation of a major portion of the carbonaceous constituents of the spent potliner material thereby producing carbon monoxide and minor quantities of carbon dioxide, the total quantity of the oxidant gas utilized in the vertical reaction tube being introduced into the oxidation zone;

(g) introducing steam into the oxidation zone to react with the remaining portion of the carbonaceous constituents of the spent potliner material to produce hydrogen and carbon monoxide;

(h) controlling the amounts of steam and oxidant gas introduced into the oxidation zone to balance the exothermic heat of reaction of the oxygen and carbonaceous constituents with the endothermic heat of reaction of the steam and the carbonaceous constituents while maintaining the oxidation zone at a temperature of about 2800 degrees Fahrenheit to about 3600 degrees Fahrenheit;

(i) removing from an upper portion of the vertical reaction tube a gaseous effluent of which at least 75% by volume is hydrogen, carbon monoxide and hydrogen fluoride; and, (j) discharging from the lower portion of the oxidation zone a vitreous frit residue.

A gaseous effluent rich in hydrogen and carbon monoxide can also be produced from spent potliner material in a gasification unit which has a gas outlet and a molten slag outlet, each of which has a cross sectional area which is smaller than the cross sectional area of the gasification unit. Burner assemblies are directed tangentially into a single gasification zone of this gasification unit. At least one upper burner assembly is located in the upper half of the gasification unit and at least one lower burner assembly is located in the lower half of the gasification unit. These burner assemblies allow simultaneous introduction of spent potliner material, oxidant gas and steam. The process in this apparatus includes the following steps:

(a) sizing pieces of spent potliner material to less than 100 microns;

(b) introducing the sized spent potliner material into the gasification unit via the feed burner assemblies.

(c) introducing into the gasification unit via the feed burner assemblies an oxidant gas containing at least 50% by volume of oxygen to affect partial oxidation of a portion of the carbonaceous constituents of the spent potliner material;

(d) co-introducing into the gasification unit via the feed burner assemblies a quantity of steam sufficient to react with the remaining portion of the carbon contained within the spent potliner material to produce a product gas of which at least 75% by volume is hydrogen and carbon monoxide;

(e) controlling the amounts of steam and oxidant gas introduced via the burner assemblies into the gasification unit to balance the exothermic heat of reaction of the oxygen and carbonaceous constituents with the endothermic heat of reaction of the steam and the carbonaceous constituents while maintaining the oxidation zone at a temperature greater than the melting point of the inorganic components of the spent potliner material;

(f) the burners being positioned such that the introduction of the spent potliner material, oxidant gas, and steam creates two streams which have a rotational flow of spent potliner material, oxygen, and steam. The stream from the upper burner has a downward rotational flow with a larger diameter, and the stream from the lower burner has an upward rotational flow with smaller diameter;

(g) removing from the upper gas outlet of the gasification unit a gaseous effluent of which at least 75% by volume is hydrogen, carbon monoxide, and hydrogen fluoride; and (h) discharging from the lower outlet of the gasification unit a vitreous frit residue.

A process according to the invention can also be carried out as a one-stage reaction in a gasification unit provided with a single burner which is at the top of the gasification unit and is directed into a single gasification zone. The steps of this process are as follows:

(a) sizing pieces of spent potliner material to less than 0.5 mm;

(b) introducing the sized spent potliner material into the gasification unit;

(c) introducing into the gasification unit via the burner an oxidant gas containing at least 50% by volume of oxygen to affect the partial oxidation of a portion of the carbonaceous constituents of the spent potliner material;

(d) co-introducing into the gasification unit via the burner a quantity of steam sufficient to react with the remaining portion of the carbon contained within the spent potliner material to produce a product gas which includes a substantial quantity of hydrogen and carbon monoxide;

(e) controlling the amounts of steam and oxidant gas introduced into the gasification unit to balance the exothermic heat of reaction of the oxygen and carbonaceous constituents with the endothermic heat of reaction of the steam and the carbonaceous constituents while maintaining the oxidation zone at a temperature greater than the melting point of the inorganic components of the spent potliner material and within the range of about 2500–3100 degrees Fahrenheit;

(f) causing molten slag produced by reactions in the gasification unit to run down the internal wall of the gasification unit, thus protecting the wall from damage;

(g) removing from a lower exit opening of the gasification unit a gaseous effluent of which at least 75% by volume is hydrogen, carbon monoxide, and hydrogen fluoride; and (h) discharging from the lower exit opening of the gasification unit a vitreous frit.

BRIEF DESCRIPTION OF THE DRAWINGS

FIG. 1 is a schematic view of a first embodiment of the invention, in which a slagging gasification unit is used to destroy spent potliner material.

FIG. 2 is a schematic view of a second embodiment of the invention, in which a two stage entrained flow gasification unit with multiple burners is used to destroy spent potliner material.

FIG. 3 is a schematic view of a third embodiment of the invention, in which a single stage entrained flow gasification unit with a single burner is used to destroy spent potliner material.

DETAILED DESCRIPTION

The subject of this invention is a process for the destruction of spent potliner material from the metal processing industry via gasification technology.

In one preferred embodiment, shown in FIG. 1, gasification is conducted via the use of a Slagging Gasification Injection apparatus. The slagging gasification unit 2 includes a pressure vessel 4, the interior of which is the gasification chamber. The gasification chamber includes a preheating zone 6 in its upper region, a reduction zone 8 below the preheating zone, and an oxidizing zone 10 below the reduction zone. Feed tubes 12 and 13 are provided for introducing SPL material and coke or coal into the preheating zone. The axes of these tubes are laterally offset from the central axis of the vessel 4, and they are oriented to promote helical flow of the feed material. Oxygen-steam tuyeres 14 and 15 are located at the lower region 10 of the vessel 4 for introducing steam and oxygen into the oxidizing zone 10.

The principal outlets of the gasification unit are the gas offtake 16 at the upper zone 6 of the vessel, and a solids outlet 18 at the lower end of the vessel. To enable the gasification unit to operate at elevated pressures, the solids inlets 12 and 13 and the solids outlet 18 are connected respectively to feed locks and a slag lock, which are not shown in FIG. 1. According to conventional practice, each of these locks includes an inlet valve and an outlet valve. Other features which are not shown in the drawings are a motor-rotated water-cooled stirrer which extends longitudinally in the vessel, a refractory lining on the interior wall of the vessel, and cooling jackets on the exterior wall of the vessel.

In this process, the spent potliner material is fed by the feed tubes 12 and 13 into the top of the gasification unit. Although additional carbon bearing fuel substrates, such as coal or coke, may be added to the top of the gasification unit as well, no additional fuel particularly propane or natural gas, is a requirement. As in the slagging gasification technology discussed above, oxygen and steam are fed by tuyeres 14 and 15 into the tuyere or hearth level of the gasification unit. The quantity of oxygen and steam fed to the slagging gasifier may be varied. A proper balance of SPL, oxygen, and steam must be preserved, however, in order to (i.) balance the exothermic partial combustion reactions with the endothermic shift reactions; (ii.) maintain the temperatures in the gasification unit within an acceptable, desired range such that the gasification of the SPL proceeds properly and completely; and (iii.) ensure the desired composition of the product gases. Generally, the ratio of SPL carbon to oxygen is in the range of 1/0.25 to 1/0.75 (w/w) while the ratio of SPL carbon to steam is in the range of 1/0.4 to 1/1.0 (w/w). One preferred ratio of SPL carbon/oxygen/steam is 1.0/0.55/0.90 (w/w/w). However, other ratios may be used equally well without departing from the spirit and intent of the claims contained herein.

The gasification unit may be operated at ambient or elevated pressures without limitation depending on individual process requirements. Such process requirements may include, but are not limited to pressure requirements for downstream equipment, e.g., the pressure requirements for a gas turbine or a chemical manufacturing unit utilizing the Synthesis Gas as a raw material. Operating pressures up to about 2,000 psig may be utilized. More preferred pressures are in the range of 100 psig through 1,200 psig. In a more preferred embodiment, pressures in the range of 350 psig through 1,000 psig may be utilized. In the hearth or partial oxidation zone 10, the carbon from the spent potliner material is partially combusted with the oxygen. The temperature in the hearth or partial oxidation zone 10 may range from, and be maintained at, a temperature greater than the melting temperature of the inorganic components of the feed (the vitreous frit melting point) up to elevated temperatures on the order of 4,000 degrees Fahrenheit. In a preferred embodiment, hearth or partial oxidation zone temperatures of 2,400–3,800 degrees Fahrenheit are achieved and maintained. In a still more preferred embodiment, hearth temperatures in the range of 2,900–3,600 degrees Fahrenheit are achieved and maintained.

Hot gases rise through and heat the descending potliner material. Immediately above the oxidation zone 10 is the reducing zone 8 in which the hot gases ascending from the oxidation zone—the carbon monoxide, carbon dioxide, hydrogen, and steam—react with the incandescent potliner material to further decompose the carbonaceous constituents of the descending potliner.

The off gases exit the slagging gasification unit via the gas offtake. Rather than being composed of carbon dioxide, water, and hydrogen fluoride, these off gases are composed primarily of carbon monoxide, hydrogen, and hydrogen fluoride along with minor quantities of carbon dioxide, methane, ethane, and ethylene. To facilitate handling, the product gases then may be cooled as desired by any number of methods known to one skilled in the art. A preferred method of cooling utilizes a series of water spray coolers to affect cool down of the product gases. Still another preferred method utilizes heat exchangers to cool down the gases without addition of water.

The hydrogen fluoride then may be scrubbed from the off gases and reutilized in the aluminum industry. The quantity of hydrogen fluoride contained within the product off gases from the slagging gasification unit depends on the quantity of fluorine present in the feed materials, most notably in the SPL itself. For SPL typically containing 12% by weight of fluorine, the hydrogen fluoride content of the product gases can range up to 10% by weight, with more typical values in the range of 7–9% by weight. A lower hydrogen fluoride content in the off gases is possible, depending on the gasification conditions employed. Before or after the hydrogen fluoride is removed, additional impurities or undesired contaminants may be removed from the product gases by appropriate means. Such impurities may include tars, oils, particulates, hydrogen sulfide, and the like. Once these impurities and the hydrogen fluoride are removed, the product gas remaining, known as Synthesis Gas, is composed primarily of carbon monoxide, hydrogen, carbon dioxide, methane, ethane and ethylene. The exact composition of this Synthesis Gas may vary and depends on the composition and quantity of the materials fed to the gasification unit, including the SPL, oxygen and steam. Without placing limitation on the claims of this specification, a typical composition of the resultant Synthesis Gas is as follows:

| Component | Percent (by volume) |
|---|---|
| Hydrogen | 29.8 |
| Carbon Monoxide | 63.7 |
| Carbon Dioxide | 3.1 |
| Methane | 2.7 |
| Ethylene | 0.2 |
| Ethane | 0.5 |

A typical range of Synthesis Gas composition is as follows:

| Component | Percent (by volume) |
|---|---|
| Hydrogen | 25–35 |
| Carbon Monoxide | 55–65 |
| Carbon Dioxide | 2–7 |
| Methane | 0–5 |
| Ethylene | 0–0.5 |
| Ethane | 0–1 |

The final product Synthesis Gas may be used for a variety of end uses, including but not limited as a fuel for a gas turbine for the generation of electric power or as chemical building blocks for chemical manufacture including, but not limited to, the manufacture of methanol, acetic acid, and acetate derivatives. Unlike the alternative technologies described above, no large excess of oxygen is required. The inorganic components of the spent potliner material, such as aluminum, sodium, other metals, and some fluoride, are incorporated in a vitreous frit in an amount up to about 35% of the weight of SPL fed to the gasification unit, which frit then is removed from the unit via the solids outlet 18 and may be used as road building aggregates, architectural blocks, in marine concrete applications, etc.

A second preferred embodiment of the invention is performed in the apparatus shown in FIG. 2. Here, the destruction of spent potliner material via gasification technology is conducted in an entrained flow gasification apparatus. This is known as a two-stage reaction process/multi-tangentially directed burners/single gasification zone gasifier as described in U.S. Pat. No. 4,773,917. In this embodiment, the SPL must be sized by crushing, grinding, or other processes to permit its entrainment in a carrier gas which flows through the gasification unit. Generally, the particle size should be less than 100 microns in diameter, although other sizes may work equally well.

The gasification unit 30 is comprised of a cylindrical gasification section 32 devoid of any internal structure. At the top of the unit is a product gas outlet 34 of diameter smaller than the cross sectional diameter of the gasification section. At the bottom of the unit is a slag outlet 36 for egress of molten slag, likewise of smaller diameter than the cross sectional diameter of the gasification 32. At the upper and lower portions of the gasification section, there are injection ports. Two such injection ports 38 and 40 are shown, but additional upper and lower injection ports can be provided. All of the injection ports introduce, into the gasification section, particles of SPL entrained in a stream of oxygen and/or steam.

The reactants (SPL, oxygen, and steam) are injected into the gasification zone tangentially with respect to the gasification section so that a circular motion of the reactants is produced. The diameter of the circular motion of material injected by the upper injection port 38 is smaller than the diameter of the gasification section but larger than the diameter of the circular motion of the material injected by the lower injection port 40. As a result, a downward helical flow (with larger diameter) from the upper injection port is opposite rotationally to the upward helical flow (with smaller diameter) from the lower injection port 40. Alternatively, the upward and downward helical flows may have the same rotational direction. The diameter of rotation resulting from the lower injection port 40 is preferably in the range of 0.25 to 0.4 times the diameter of rotation resulting from the upper injection port 38. This provides for increased residence times of the particles within the gasifier itself. The product gases (Synthesis Gas, hydrogen fluoride, and other minor components) exit the gasification unit from the upper product gas outlet 34, while molten slag from the inorganic portion of the SPL exits the gasifier via the molten slag outlet 36. The product gases and the molten slag may be processed further as in the Slagging Gasification Injection embodiment discussed above, removing the hydrogen fluoride for recycle, removing the minor contaminants, and resulting in a clean Synthesis Gas for use as a fuel or chemical feed stock. The material injected into the gasification unit via the upper injection port 38 is in a ratio of oxygen/SPL carbon within the range of approximately 0/1.0 (w/w) to 0.65/1.0 (w/w). As a result, this material is fed in an "oxygen deficient" manner. The material injected via the lower injection port 40 is in a ratio of oxygen/SPL carbon within the range of approximately 0.9/1.0 (w/w) to 1.6/1.0 (w/w). As a result, this material is fed in an "oxygen sufficient" manner. Combined, this results in an efficient gasification of the SPL to Synthesis Gas and hydrogen fluoride.

In a third preferred embodiment, the destruction of SPL via gasification technology is conducted in another type of entrained flow gasification apparatus which is shown in FIG. 3. This is known as a one-stage reaction process/single-burner type/single gasification zone gasification unit. Such gasification units are described in U.S. Pat. Nos. 4,325,709 and 4,209,304.

This apparatus has a water cooled vessel 50 enclosed in a refractory housing which is not shown in FIG. 3. An inlet 52 or separate inlets at the upper end of the vessel 50 introduces the reactants into the gasification chamber 54 within the vessel. In the lower region of the chamber, there is a centrally located slag outlet 54 and a cylindrical gas outlet manifold 56 which is provided with a discharge pipe 58 for the gaseous effluent.

In this type of gasification unit, the SPL must be reduced in particle size to less than approximately 0.5 mm by crushing, grinding or other suitable means. The SPL is entrained within an inert carrier gas stream which is injected into the top of the gasification unit 50 along with oxygen and steam (if desired). As in the previous gasifier types, partial combustion reactions followed by reduction reactions convert the carbon content of the SPL into a synthesis gas and the fluorine content to hydrogen fluoride. The temperature within the gasification zone 54 is elevated as in the prior cases. A temperature range of 2,500–3,100 degrees Fahrenheit is appropriate. Also, as in the case of the previous gasifier types, the inorganic component of the SPL is converted to a molten slag state at the temperatures within the gasification zone. This molten slag converges on and runs down the internal wall of the gasification unit. The inner wall of the unit may be protected from damage by a refractory lining and a layer of solidified slag. The hot product gases (Synthesis Gas, hydrogen fluoride and other minor components) and the molten slag exit the gasification chamber via the cylindrical collection chamber 58 and a slag outlet pipe at the bottom of the gasification unit. The product gases and the molten slag may be processed further as in the Slagging Gasification Injection approach discussed above, by removing the hydrogen fluoride for recycle, and removing the minor contaminants, thus resulting in a clean Synthesis Gas for use as a fuel or chemical feed stock. As in the previous cases, this gasifier may be operated at ambient or elevated pressures without limitation depending on individual process requirements. Operating pressures up to about 2,000 psig may be utilized, preferably in the range of 100 psig through 1,200 psig, and more preferably in the range of 350 psig through 1,000 psig.

Persons skilled in the art will recognize that the invention claimed herein may be practiced in gasifiers of many other designs. Although three embodiments of this invention have been described for purposes of illustration and clarification, variations can be made without departing from the spirit and scope of the invention defined by the claims herein contained. For example, applicable gasification units include, but are not limited to, one-stage reaction/multi-opposed burners/single gasification zone units (i.e., the Shell Process of U.S. Pat. No. 2,516,141); one-stage reaction/multi-tangentially directed burners/single gasification zone units (i.e., the Boliden Aktiebolag gasifier design of Japanese Patent Application Kokai [Laid-Open] No. 200492/82); two-stage reaction/multi-tangentially directed burners/multi gasification zone units (i.e., the Combustion Engineering design of U.S. Pat. No. 4,168,956); and the like.

Gasification technology (via Slagging Gasification Injection, Entrained Flow Gasification, or other gasification techniques) for the destruction of spent potliner material from the aluminum industry represents the first true, total recycling method for elimination of this classified hazardous waste. All the carbon content of the spent potliner material is converted to a synthesis gas which may be utilized for the production of electricity or the production of chemicals. Trace organic components listed as toxic constituents, such as cyanide and polyaromatic hydrocarbons, are totally destroyed in the slagging gasifier and converted to synthesis gas. Fluorine is recovered as hydrogen fluoride or as aqueous hydrofluoric acid and may be reutilized in the aluminum industry. All inorganic components of the potliner, excluding the bulk of the fluorine, are retained in a non-leachable vitreous frit which also has utility in a number of areas. The use of pure oxygen rather than air limits the quantity of gases which must be cleaned, thereby reducing total costs.

All other technologies currently proposed as being suitable for the destruction of spent potliner material have severe deficiencies which limit their utility. For example, large quantities of excess oxygen are utilized, thereby resulting in the production of carbon dioxide and water rather than a synthesis gas. Also, additional fuels such as propane or natural gas or energy sources such as a plasma arc are required to achieve the high temperatures required to complete the combustion or destruction of the spent potliner material. This adds to the cost of the proposed processes. Some processes require the addition of substantial quantities of materials such as sand, silicon dioxide, limestone, and the like. The addition of these materials not only increases the cost of the process but also increases the quantity of materials that must be disposed of ultimately. In fact, addition of these materials constitutes dilution of the potliner waste material and goes against EPA priorities for the elimination of classified hazardous wastes.

The present invention greatly reduces the quantity of both the oxidation gas (because of the use of pure oxygen) and the quantity of vitreous frit, as additional additives are not necessarily required.

This does not mean that additional modifications of the technology are not covered. Indeed, addition of fluxing agents such as limestone or silicon dioxide may be utilized to improve or change the melt characteristics of the vitreous frit material. This specification likewise does not limit the addition or co-addition of other fuels such as coke or coal in the solid phase, or natural gas or propane in the gaseous phase. In addition, the co-destruction of other waste materials such as liquid industrial wastes, municipal solid wastes, and sewage sludge solids is not precluded by this invention.

It is again emphasized that the invention may take many forms other than those described in the specification. Process parameters including reactants, additives, temperatures, supplemental fuels and effluent gases may vary from those described hereinabove. The following claims are to be interpreted under U.S. law to cover the subject matter literally recited in the claims, and also the equivalents thereof.

We claim:

1. A process for producing a gaseous effluent rich in hydrogen and carbon monoxide from spent potliner material from the metal processing industry, said spent potliner material having inorganic and carbonaceous constituents, said process comprising the steps of:

(a) feeding into a gasification unit a feed which includes pieces of spent potliner material which have inorganic and carbonaceous constituents;

(b) allowing the spent potliner material to react with an oxidant gas containing at least 50% by volume of oxygen in a partial oxidation reaction to form a mixture of gases including carbon monoxide and carbon dioxide, said partial oxidation reaction providing a high temperature zone which is at a higher temperature than the melting temperature of the inorganic constituents of the spent potliner material;

(c) allowing said mixture of gases from said partial oxidation reaction to react in reduction reactions with spent potliner material in the presence of steam and absence of oxygen to form hot gaseous products which include carbon monoxide, hydrogen and hydrogen fluoride;

(d) controlling the quantities of steam and oxidant gas introduced into the gasification unit to balance the exothermic heat of reaction of said oxygen and said carbonaceous constituents of the spent potliner material with the endothermic heat of reaction of said steam and said carbonaceous constituents while maintaining a temperature in said high temperature zone greater than the melting temperature of the inorganic constituents of the spent potliner material;

(e) removing from the gasification unit a gaseous effluent of which at least 75% by volume is hydrogen, carbon monoxide, and hydrogen fluoride; and (f) discharging from the gasification unit residual solids of processed potliner material.

2. A process according to claim 1, wherein said gasification unit is a Slagging Gasification Injection unit which has a reaction tube with a preheating zone, a reduction zone below said preheating zone, and an oxidation zone below said reduction zone, said process including steps of introducing said oxidant gas into said oxidation zone and introducing steam into said reduction zone.

3. A process according to claim 1, wherein said gasification unit is an entrained flow gasification unit, said process including the step of entraining particles of the spent potliner material of said feed in a gaseous stream.

4. A process according to claim 3, wherein said entrained flow gasification unit is a two-stage reaction process/multi-tangentially directed burners/single gasification zone gasification unit, said gaseous stream being moved in a rotational path in said gasification unit.

5. A process according to claim 3 wherein first and second gaseous streams are introduced tangentially at opposite ends of a gasification zone of said gasification unit.

6. A process according to claim 5 wherein said first stream has a rotational path with a larger diameter than said second stream.

7. A process according to claim 3, wherein said entrained flow gasification unit is a one-stage reaction process/single burner/single gasification zone gasification unit, and said gaseous stream moves in an axial path in said gasification unit.

8. A process according to claim 7 wherein said gaseous stream is introduced longitudinally into one end of said gasification unit.

9. A process according to claim 3, wherein said process comprises a one-stage reaction conducted in a single gasification zone, said gasification unit having opposed burners directed into said gasification zone.

10. A process according to claim 3, wherein said process comprises a one-stage reaction conducted in a single gasification zone, said gasification unit having tangentially directed burners directed into said gasification zone.

11. A process according to claim 3, wherein said process comprises a two-stage reaction conducted in a plurality of gasification zones, said gasification unit having tangentially directed burners directed into said gasification zones.

12. A process according to claim 3, wherein said gaseous stream is introduced into a gasification zone of said gasification unit from a burner which is directed tangentially into said gasification zone.

13. A process according to claim 3, wherein multiple streams are introduced into said gasification zone.

14. A process according to claim 13, wherein said streams are introduced into said gasification zone by burners which are directed tangentially of said gasification zone.

15. A process according to claim 13, wherein said multiple streams are introduced into said gasification zone by mutually opposed burners.

16. A process according to claim 13, wherein said streams are introduced into multiple gasification zones.

17. A process according to claim 1 including the step of feeding limestone into the gasification unit to aid in purification of the gaseous effluent.

18. A process according to claim 1 including the step of feeding into the gasification unit an additive including a constituent selected from the group consisting of limestone, sand, and silicon dioxide to change the melt flow characteristics of the residual solids discharged from the gasification unit.

19. A process for producing a gaseous effluent rich in hydrogen and carbon monoxide from a feed of spent potliner material from the metal processing industry, said spent potliner material having inorganic and carbonaceous constituents, said process being carried out in a vertical reaction tube which has a preheating zone, a high temperature reduction zone which is below said preheating zone, and a high temperature oxidation zone which is below said reduction zone, said process comprising the steps of:

(a) feeding pieces of spent potliner material into said preheating zone of the vertical reaction tube;

(b) allowing said pieces to flow downward through the preheating zone while they are heated to a temperature of at least about 2000 degrees Fahrenheit at which they are incandescent;

(c) allowing the preheated potliner material to flow downward from the preheating zone into the reduction zone (d) directly contacting said potliner material in said reduction zone with hot gases which include hydrogen and carbon monoxide rising from the oxidation zone, thereby causing further destruction of the potliner material and the simultaneous pyrolysis of any carbonaceous constituents contained therein; said potliner material being heated in the reducing zone to a temperature of at least about 2600 degrees Fahrenheit;

(e) allowing the pieces of spent potliner material to flow downward from the high temperature reduction zone to the high temperature oxidation zone;

(f) introducing into the oxidation zone an oxidant gas containing at least 50% by volume of oxygen to affect the partial oxidation of a major portion of the carbonaceous constituents of the spent potliner material thereby producing carbon monoxide and minor quantities of carbon dioxide, the total quantity of said oxidant gas utilized in said vertical reaction tube being introduced into the oxidation zone;

(g) introducing steam into the oxidation zone to react with the remaining portion of the carbonaceous constituents of the spent potliner material to produce hydrogen and carbon monoxide;

(h) controlling the amounts of steam and oxidant gas introduced into the oxidation zone to balance the exothermic heat of reaction of said oxygen and carbonaceous constituents with the endothermic heat of reaction of said steam and said carbonaceous constituents while maintaining the oxidation zone at a temperature of about 2800 degrees Fahrenheit to about 3600 degrees Fahrenheit;

(i) removing from an upper portion of the vertical reaction tube a gaseous effluent of which at least 75% by volume is hydrogen, carbon monoxide and hydrogen fluoride; and (j) discharging from the lower portion of the oxidation zone a vitreous frit residue.

20. A process according to claim 19, including the step of feeding limestone into the gasification unit to aid in purification of the gaseous effluent.

21. A process according to claim 20, including the step of feeding into the gasification unit an additive including a constituent selected from the group consisting of limestone, sand, and silicon dioxide to change the melt flow characteristics of the vitreous frit discharged from the gasification unit.

22. A process for the production of gaseous effluent rich in hydrogen and carbon monoxide from a feed of spent potliner material from the metal processing industry, said spent potliner material having inorganic and carbonaceous constituents, said process being carried out as a two-stage reaction process utilizing burners which are directed tangentially into a single gasification zone of a gasification unit, which process comprises the steps of:

(a) sizing pieces of spent potliner material to less than 100 microns;

(b) introducing sized spent potliner material into a gasification unit which has a gas outlet and a molten slag outlet, each of said outlets having a cross sectional area which is smaller than the cross sectional area of the gasification unit;

sized spent potliner material being introduced into said gasification unit via feed burner assemblies, an upper said burner assemblies being located in the upper one half of the gasification unit and a lower said burner assemblies being located in the lower one half of the gasification unit; said burner assemblies allowing simultaneous introduction of spent potliner material, oxidant gas and steam.

(c) introducing into said gasification unit via the feed burner assemblies an oxidant gas containing at least 50% by volume of oxygen to affect partial oxidation of a portion of the carbonaceous constituents of the spent potliner material;

(d) co-introducing into said gasification unit via the feed burner assemblies a quantity of steam sufficient to react with the remaining portion of the carbon contained within the spent potliner material to produce a product gas of which at least 75% by volume is hydrogen and carbon monoxide;

(e) controlling the amounts of steam and oxidant gas introduced via the burner assemblies into the gasification unit to balance the exothermic heat of reaction of said oxygen and carbonaceous constituents with the endothermic heat of reaction of said steam and said carbonaceous constituents while maintaining the oxidation zone at a temperature greater than the melting point of the inorganic components of the spent potliner material;

(f) said burner assemblies being positioned such that the introduction of said spent potliner material, oxidant gas, and steam creates a rotational flow of spent potliner material, oxygen, and steam with differing circular diameters, thereby establishing a downward rotational flow with larger diameter from the upper burner assembly and an upward rotational flow with smaller diameter from the lower burner assembly;

(g) removing from the upper gas outlet of said gasification unit a gaseous effluent of which at least 75% by volume is hydrogen, carbon monoxide, and hydrogen fluoride; and (h) discharging from the lower outlet of said gasification unit a vitreous frit residue.

23. A process according to claim 22 including the step of feeding limestone into the gasification unit to aid in purification of the product gas.

24. A process according to claim 22 including the step of feeding into the gasification unit an additive including a constituent selected from the group consisting of limestone, sand, and silicon dioxide to change the melt flow characteristics the vitreous frit discharged from the gasification unit.

25. A process for the production of gaseous effluent rich in hydrogen and carbon monoxide from a feed of spent potliner material from the metal processing industry, said spent potliner material having inorganic and carbonaceous constituents, said process being carried out as a one-stage reaction in a gasification unit with a single burner which is directed into a single gasification zone, said process comprising the steps of:

(a) sizing pieces of spent potliner material to less than 0.5 mm;

(b) introducing sized spent potliner material into said gasification unit via a burner located at the top of said gasification unit;

(c) introducing into said gasification unit via the burner an oxidant gas containing at least 50% by volume of oxygen to affect the partial oxidation of a portion of the carbonaceous constituents of the spent potliner material;

(d) co-introducing into said gasification unit via the burner a quantity of steam sufficient to react with the remaining portion of the carbon contained within the spent potliner material to produce a product gas which includes a substantial quantity of hydrogen and carbon monoxide;

(e) controlling the amounts of steam and oxidant gas introduced into the gasification unit to balance the exothermic heat of reaction of said oxygen and carbonaceous constituents with the endothermic heat of reaction of said steam and said carbonaceous constituents while maintaining the oxidation zone at a temperature greater than the melting point of the inorganic components of the spent potliner material and within the range of about 2500–3100 degrees Fahrenheit;

(f) causing molten slag produced by reactions in said gasification unit to run down the internal wall of the gasification unit, thus protecting the wall from damage;

(g) removing from a lower exit opening of said gasification unit a gaseous effluent of which at least 75% by volume is hydrogen, carbon monoxide, and hydrogen fluoride; and (h) discharging from said lower exit opening of said gasification unit a vitreous frit.

26. A process according to claim 25 including the step of feeding limestone into the gasification unit to aid in purification of the product gas.

27. A process according to claim 25 including the step of feeding into the gasification unit an additive including a constituent selected from the group consisting of limestone, sand, and silicon dioxide to change the melt flow characteristics of the vitreous frit discharged from the gasification unit.

* * * * *